(12) United States Patent
Kautto-Koivula et al.

(10) Patent No.: US 8,676,921 B1
(45) Date of Patent: Mar. 18, 2014

(54) CONTEXTUAL MAPPING BASED LEARNING BY CONVERTING INFORMATION

(75) Inventors: Kaisa Kautto-Koivula, Espoo (FI); Tomi Konkonen, Espoo (FI)

(73) Assignee: Nokia Corporation, Espoo (FI)

( * ) Notice: Subject to any disclaimer, the term of this patent is extended or adjusted under 35 U.S.C. 154(b) by 3326 days.

(21) Appl. No.: 09/678,050

(22) Filed: Oct. 3, 2000

(51) Int. Cl.
*G06F 15/16* (2006.01)
*G09G 3/04* (2006.01)

(52) U.S. Cl.
USPC ............ 709/217; 709/246; 345/33; 345/34; 345/35; 345/440.2

(58) Field of Classification Search
USPC ............ 709/246, 200, 217; 345/734, 753
See application file for complete search history.

(56) References Cited

U.S. PATENT DOCUMENTS

| | | | | |
|---|---|---|---|---|
| 4,493,655 A | | 1/1985 | Groff | G09B 7/00 |
| 5,581,677 A | * | 12/1996 | Myers et al. | 345/440 |
| 5,727,159 A | * | 3/1998 | Kikinis | 709/246 |
| 5,748,188 A | * | 5/1998 | Hu et al. | 715/853 |
| 5,952,994 A | * | 9/1999 | Ong et al. | 345/668 |
| 6,029,043 A | | 2/2000 | Ho et al. | G09B 3/00 |
| 6,062,862 A | | 5/2000 | Koskinen | 434/107 |
| 6,185,582 B1 | * | 2/2001 | Zellweger et al. | 715/212 |
| 6,233,452 B1 | * | 5/2001 | Nishino | 455/435.2 |
| 6,275,941 B1 | * | 8/2001 | Saito et al. | 726/2 |
| 6,336,035 B1 | * | 1/2002 | Somoza et al. | 455/446 |
| 6,381,535 B1 | * | 4/2002 | Durocher et al. | 701/423 |
| 6,427,063 B1 | * | 7/2002 | Cook et al. | 434/350 |
| 6,480,885 B1 | * | 11/2002 | Olivier | 709/207 |
| 6,523,032 B1 | * | 2/2003 | Sunkara et al. | 1/1 |
| 6,563,494 B1 | * | 5/2003 | Eichstaedt et al. | 345/179 |
| 6,654,814 B1 | * | 11/2003 | Britton et al. | 709/246 |
| 6,674,767 B1 | * | 1/2004 | Kadyk et al. | 370/466 |
| 6,681,211 B1 | * | 1/2004 | Gatto | 705/36 R |
| 6,727,930 B2 | * | 4/2004 | Currans et al. | 715/864 |
| 7,219,304 B1 | * | 5/2007 | Kraenzel et al. | 715/755 |
| 7,360,082 B1 | * | 4/2008 | Berthold et al. | 713/157 |
| 7,418,431 B1 | * | 8/2008 | Nies et al. | 706/21 |
| 7,844,276 B2 | * | 11/2010 | Kraiem et al. | 455/446 |

FOREIGN PATENT DOCUMENTS

| | | | | |
|---|---|---|---|---|
| EP | 0 618 582 A2 | 10/1994 | | G11B 27/031 |
| JP | 6-175572 | 6/1994 | | G09B 5/06 |
| JP | 10-161514 | 6/1998 | | G09B 5/02 |
| WO | WO 97/02551 | 1/1997 | | G09B 5/02 |
| WO | WO 99/03083 | 1/1999 | | |
| WO | WO 99/09083 A1 | 2/1999 | | |
| WO | WO 99/49680 | * 9/1999 | | H04Q 7/22 |

OTHER PUBLICATIONS

Courter et al., Microsoft Office 2000 Professional Edition, copyright 1999, pp. 601-621.*

(Continued)

*Primary Examiner* — Backhean Tiv
(74) *Attorney, Agent, or Firm* — Ditthavong Mori & Steiner, P.C.

(57) ABSTRACT

A method, network server, communication device and system of preparing a pictorial representation of information. The system comprises a server for providing information and generating the pictorial representation, a wireless network for communicating said server over the air waves, and wireless terminals of said wireless network for receiving the information and making mark-ups or indications to the information from which the pictorial representation is created.

16 Claims, 10 Drawing Sheets

(56) References Cited

OTHER PUBLICATIONS

Esterhay R. J: "User Metaphors for Health Care Professional Workstations" International Journal of Bio-Medical Computing, Elsevier Science Publishers, Shannon, IE. vol. 34, No. 1/4, 1994, p. 95-113, XP000417161.

Jan Ross: "A new way of information retrieval: 3d indexing and concept mapping" Learned Publishing, vol. 13, No. 2, Apr. 2000, pp. 119-123, XP002244051.

PCT Written Opinion International Application No. PCT/IB01/01816 Dated Oct. 26, 2006.

http://www.mindmanager.com, Nov. 24, 1999, 2 pages.

* cited by examiner

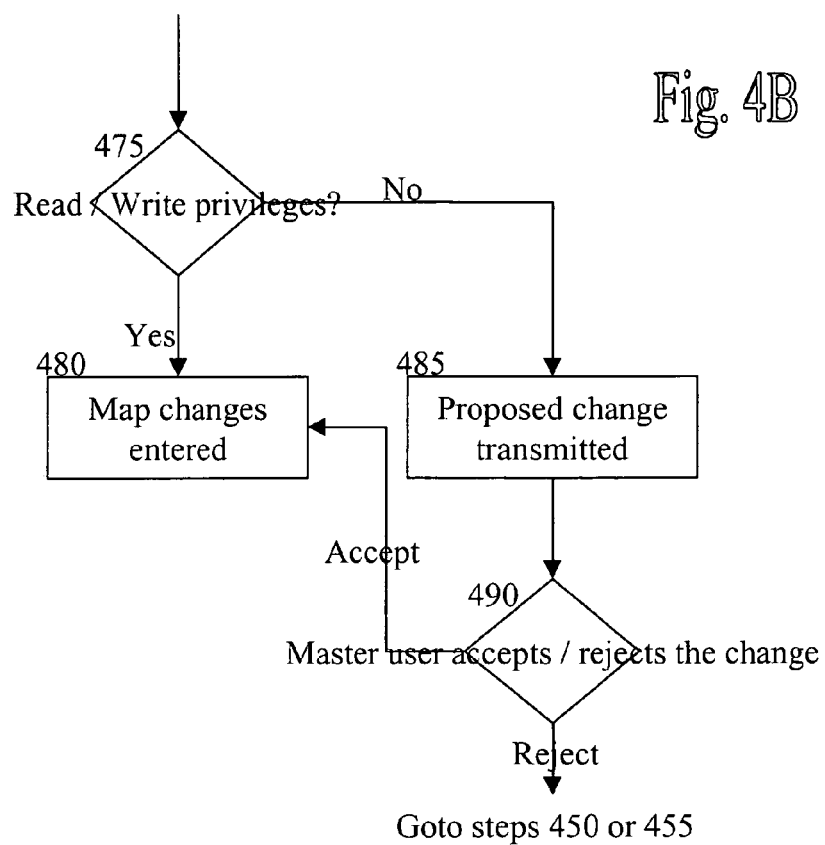

Fig. 6A

Learning methods

1. By Imitation
1.1 Listening
1.2 Seeing
1.3 Doing

2. By told
2.1 Formal education & training
2.2 Lecturing
2.3 Listening
2.4 Delivered
2.5 Delivery of content

3 By collaboration
3.1 Content in context
3.2 Creation of new content
3.3 Exchange of content
3.4 Virtual communities
3.5 Case studies
3.6 Story telling
3.7 Seminars, workshops
3.8 Role playing
3.9 Questions & answers
3.10 Socratic dialog
3.11 projects, meetings
3.12 Team based learning
3.13 Real problem solving
3.14 collective knowledge development
3.15 Relax, Coffee breaks

Fig. 6B

4. By self-study from resources
4.1 Books
4.2 Articles
4.3 News
4.4 Magazines
4.5 Documents
4.6 e-Learning material
4.7 Access to resources
4.8 Prepared content
4.9 Learning on demand
4.10 reading

5. By doing
5.1 Alone
5.2 With collaboration
5.3 working
5.3.1 getting experiences
5.4 Exercising
5.4.1 Drawing
5.4.2 Calculating
5.4.3 Solving problems
5.4.4 writing

6. By all senses
6.1 Seeing
6.2 Hearing
6.3 Touching
6.4 Tasting
6.5 Smelling
6.6 Feeling

CONTEXTUAL MAPPING BASED LEARNING BY CONVERTING INFORMATION

BACKGROUND OF THE INVENTION

1. Field of the Invention

The invention relates to an educational or demonstration method and system whereby a pictorial representation of selected items or concepts in a presentation or a description may be generated using a user's indications. It is further preferably, but not restricted to, used collaboratively by making the presentation by multiple participants communicating with one another. The invention is suited especially, though not necessarily, for wireless communication.

2. Description of the Related Art

Different people organize and record information in different ways. Usually, a person learns to adopt the organizational methodology by which he or she best learns, understands and remembers the content he or she is organizing. For example, some people organize and record information best by outlining the information in list form; others prefer to describe the same information that might be placed in an ordinary list using figures. This presentation by figures (i.e., pictorial representations) demonstrating the interrelationship of information, such as the interrelationship of various topics, concepts, or persons, has been termed by some as "mapping" of the information.

Various prior art software programs may be used to create a presentation by figures ("map" or "figure") in lieu of a conventional outline. This map may show one or more nodes and branches emanating from the branches, each branch devoted to a group of related information, such as related concepts and sub-concepts. See, e.g., a picture in FIG. 7 which was created using the mapping program known as Mind Manager from MindJET, LLC of Sausalito, Calif. (Web site: www.mindmanager.com). The branches may then be further subdivided into sub-branches to illustrate more detailed topics or ideas within the related concept for the respective branch. Graphical tools, such as illustrations of various kinds and coding (e.g. similar colors to connect related concepts, and different colors for disparate concepts, etc.), can be incorporated into the map to help illustrate the information and to assist in creating a presentation that is more easily understood and remembered. Other graphical tools available in the software may also be used to enhance the appearance of the map according to a user's preferences.

These prior art programs may have limited versatility because textual entries on the map must be manually entered on a keyboard of a computer into the map and cannot be imported from an existing document. This can take time and attract user's attention away from, for example, studying. Moreover, persons using this software may work together on the preparation of the map over the Internet only from a fixed terminal, such as a personal computer connected to the Internet, but not from a wireless or mobile terminal, where the capabilities, such as the location of the terminal, are not so heavily restricted. Also, while making the map, users may only have a limited possibility of communicating when using prior art programs. The transmission path in a wireless environment has more restrictions, including limited transmission capabilities, and the currently high transmission costs. Therefore, there is a need for an easy and cheap method and system enabling wireless terminals to be utilized for this kind of invention.

SUMMARY OF THE INVENTION

Accordingly, it is an object of the present invention to enable a user and provide a system to generate a graphical figure that is a pictorial presentation of certain selected portions or concepts of information by making at least one indication to categorize the information in certain ways.

According to the present invention, a system is created for preparing a pictorial representation of information which includes, but is not limited to knowledge, whether comprising text or other data, without having to retype the text of the information onto the pictorial representation. The system includes a first terminal on which the information to be analyzed is viewable. Using an input device at the first terminal, a user is able to demarcate a selected portion or portions of the document by making an indication, such as by highlighting or underlining key words, or by partitioning the document into sections. The user may also assign each respective selected portion of the document to a category from a predefined or user-specified set of categories. The information concerning the demarcation of the selected portions of the information, such as the document, and the assignment of each respective selected portion of the document to a category is transmitted from the first terminal to a server. The first terminal may be a wireless terminal (the terms "mobile terminal" and "wireless terminal" are used herein interchangeably) in which case the transmission is from the wireless terminal to a first wireless communications network with which the wireless terminal has a link, and the first wireless communications network transfers this information to the server, which may be a Web server accessible via/by the Internet.

The Web server stores the information from the first terminal and uses it to generate the pictorial presentation. The pictorial illustration generated is then transmitted to the first terminal and/or other wireless or fixed terminals where others may make changes or suggest changes to the pictorial representation. Changes are forwarded to the Web server where they are processed if a user who makes the changes has permission, such as read/write privileges, to make the changes. A revised pictorial representation is then sent to the first terminal and/or other terminals for review and possible further changes. The transmission from the Web server to the wireless terminals may be via the wireless communications network or networks through which the wireless terminals communicate with the Web server or by any other ways such as broadcasting the pictorial representation for receipt by the various participants who are given authority to suggest or make revisions to the pictorial representation of the document.

The map may also be generated in the wireless terminal and after the generation transferred to the Web server. The Web server transfers the map to the first terminal and/or other wireless or fixed terminals where others may make or suggest changes to the pictorial representation. The wireless terminal may also transfer the indications or mark-ups concerning the demarcation of the selected portions of the information, such as the document, to the Web server. Now, the Web server has the document also and can generate the map according to the indications or mark-ups made by the user.

Users of the system can be physically situated anywhere in the coverage area of the networks and use the wireless network to study online collectively. Moreover, because one is able to select words in an existing document to form a pictorial representation or the map, users are more easily able to create the map and the users can focus on the content and not on entering or keying in the information or notes. This allows users to learn, remember, and understand the content better and more effectively.

Other object and features of the present invention will become apparent from the following detailed description considered in conjunction with the accompanying drawings.

It is understood, however, that the drawings and the description are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate and procedures described herein.

BRIEF DESCRIPTION OF THE DRAWINGS

In the drawings:

The method and the apparatus according to the invention will be described in more detail by means of preferred embodiments, with reference to the appended drawings in which:

FIGS. 4A and 4B illustrate a flow chart of the steps for performing the method according to the embodiment of the invention;

FIGS. 6A and 6B illustrate an outline of demarcation indications in a list mode;

DETAILED DESCRIPTION OF THE PRESENTLY PREFERRED EMBODIMENTS

Figure 1:
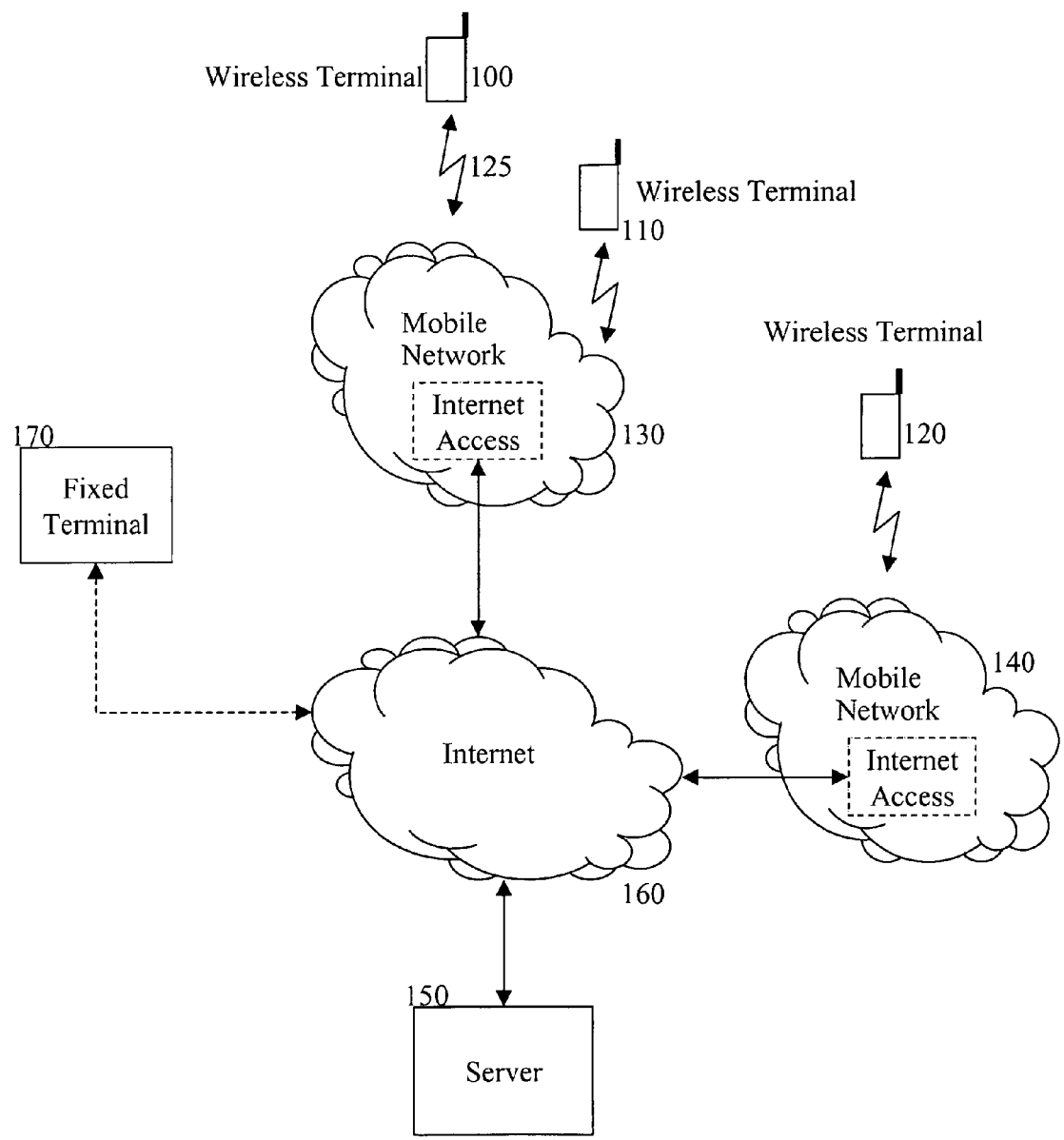
FIG. 1 depicts a block diagram of a system architecture used by the embodiment of the invention.

Referring to FIG. 1, a system for implementing the present invention provides one or more users with wireless terminals 100, 110, 120 such as a mobile phone, a personal digital assistant (PDA), or another terminal that wirelessly links to a wireless communications network, for example, a mobile or wireless network. The wireless terminals 100, 110, 120 are capable of presenting data information in various ways such as text, voice, audio, and multimedia. The wireless terminals 100, 110, 120 may be connected or be under coverage of one or more mobile networks. FIG. 1 illustrates an example where terminals 100 and 110 are connected to a mobile network 130 and the terminal 120 is connected to a mobile network 140. The mobile networks 130 and 140 may be any type of wireless communication network or combination of networks, including, but not limited to, GSM (Global Standard for Mobile/Groupe Speciale Mobile), GPRS (General Packet Radio System), UMTS (Universal Mobile Telephone System) or 3G (Third generation of mobile communications), where 3G can be compatible with GSM, HSCSD (High Speed Circuit Switched Data), GPRS, EDGE (Enhanced Data Rates for Global/GSM Evolution) and WCDMA (Wideband Code Division Multiple Access). Various other network system can also be supported in 3G, such as CDMA (Code Division Multiple Access), PDC (Personal Digital Communications), and CDMA2000. The mobile networks 130 and 140 may also be WLAN (Wireless Local Area Network). The transmission may also be broadcast via DAB (Digital Audio Broadcasting) or DVB (Digital Video Broadcasting).

Wireless terminals 100, 120, 130 communicate with a Web server 150 via the mobile networks 130, 140 that provide access to the Internet 160. Thus, the mobile networks 130, 140 work as a gateway between wireless terminals 100, 110, 120 and Web server 150 and enable wireless terminals 100, 110, 120 to communicate with the Web server 150 even when the mobile networks are not the same types. For example, the mobile network 120 may be a GPRS network and the mobile network 130 may be a WCDMA network. In addition to being accessed using the wireless terminals 100, 110, 120 Web server 150 may also be accessed over the Internet 160 using a fixed terminal 170, such as a general purpose desktop computer, or a Web TV terminal or, although not illustrated, Web server 150 may be connected directly to mobile networks 130, 140 or be a part of the mobile networks so that the Web server 150 can be accessed by wireless terminals 100, 110, 120 without passing through the Internet 160.

Figure 2:
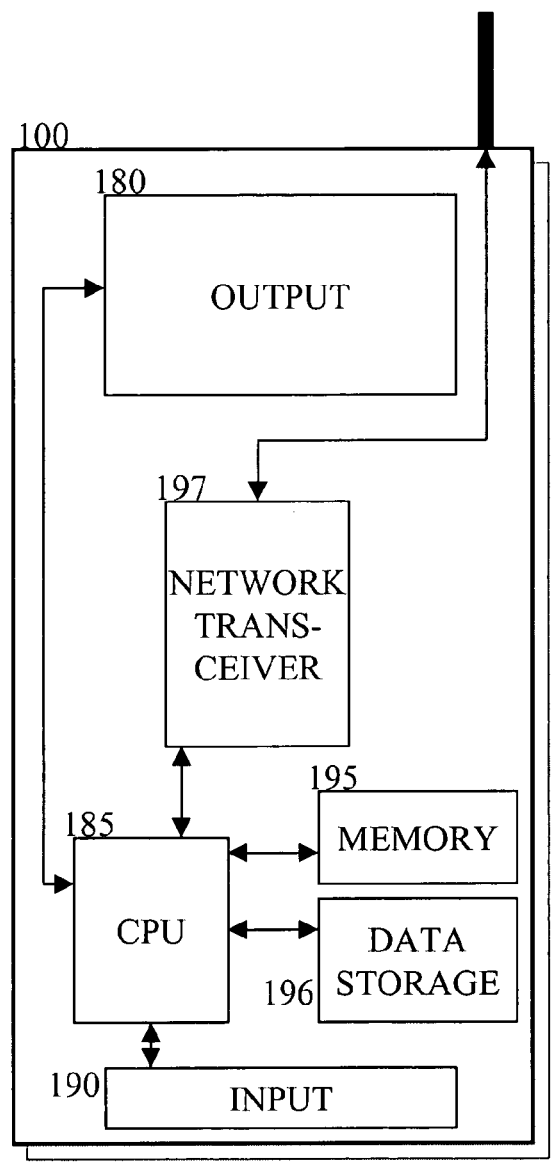
FIG. 2 depicts a block diagram of a wireless terminal showing components used in the embodiment of the invention in the terminal.

Referring to FIG. 2, the wireless terminal 100, for example, (wireless terminals 110, 120 generally have the same components) has various components comprising an output 180 that allows, for example, the user to visually read information on a display. The output 180 may also provide voice or sound of the information through a loudspeaker (not shown), and it may also display multimedia information such as video on the display. The wireless terminal 100 also comprises a central processing unit (CPU) 185 to process the information, and one or more inputs 190 for inputting the information into the terminal. Input 190 or means for input may be, for example, a numeric keypad, a keyboard, a software keyboard touch screen, a touch screen (in combination with the output 180), a mouse, a pointing device such as pointing pen, etc. The wireless terminal comprises also a network transceiver 197 that is used in communication with the mobile networks, a memory 195 and a data storage 196. The data storage 196 can be, for example, a hard disk magnetic or optical storage unit, as well as a CD-ROM drive or a flash memory. The data storage 196 can also be used to store and retrieve the generated map, especially if the wireless terminal is capable of processing and storing large amounts of data. The wireless terminal can also have a mapping program tool to generate the map as will be described in the process step 430 in FIG. 4A.

Figure 3:
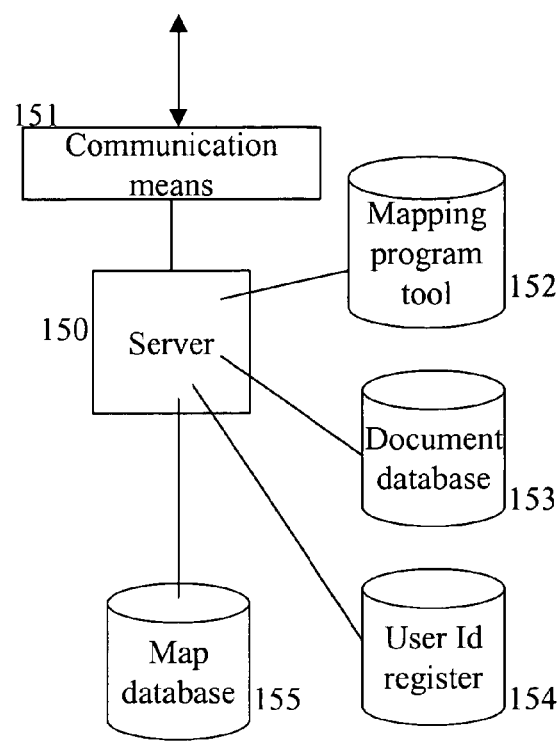
FIG. 3 depicts a block diagram of a server having elements used in the embodiment of the invention in the server.
Figure 7:
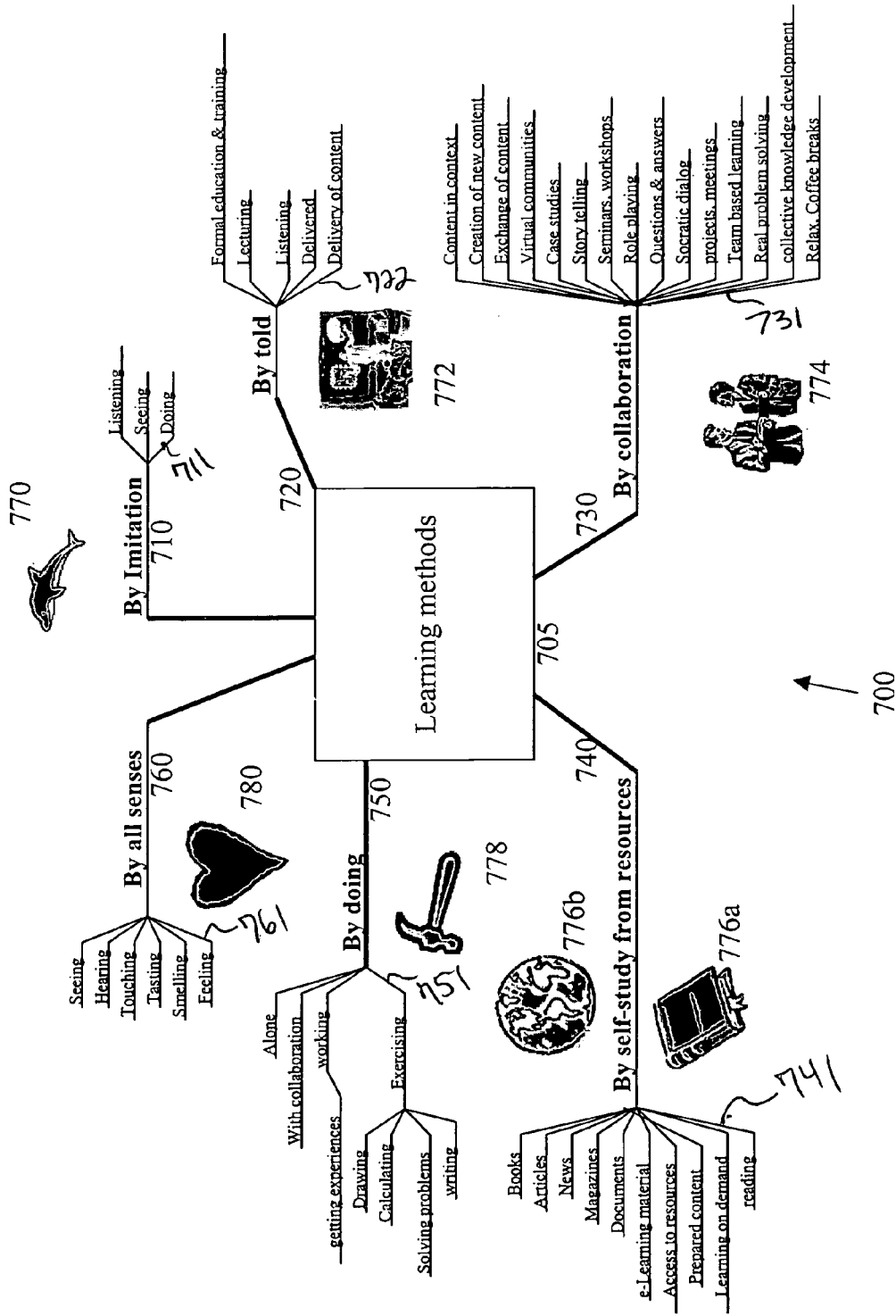
FIG. 7 depicts a pictorial representation of the concepts outlined in FIGS. 6A and 6B shown graphically.

Referring to FIG. 3, the web server 150 also comprises components to be used in the invention. The web server 150 comprises a mapping program tool 152 that is used in generating and processing the map as will be described later in process step 435 in FIG. 4A, a document database 153 that has the information, such as a document database, from which the map is created, a user ID registration 154 that is used to identify and authorize users and set their privileges to modify the information, a communication means 151 that is used in communication with the network, for example, the Internet 160 or the mobile network 130, 140, and a map database 155 that can be used to store and retrieve the generated map. The mapping program tool can be a software application that utilizes the partitions, indications, key words or sections of the document as received to generate a map, such as map 700 shown in FIG. 7. Software which uses the received data from the wireless terminal 100 to create the map is known to one of ordinary skill in the art. An example of such software is the MindManager program. The mapping program tool can also link a document from document database 153 to the corresponding map from map database 155.

Figure 4A:
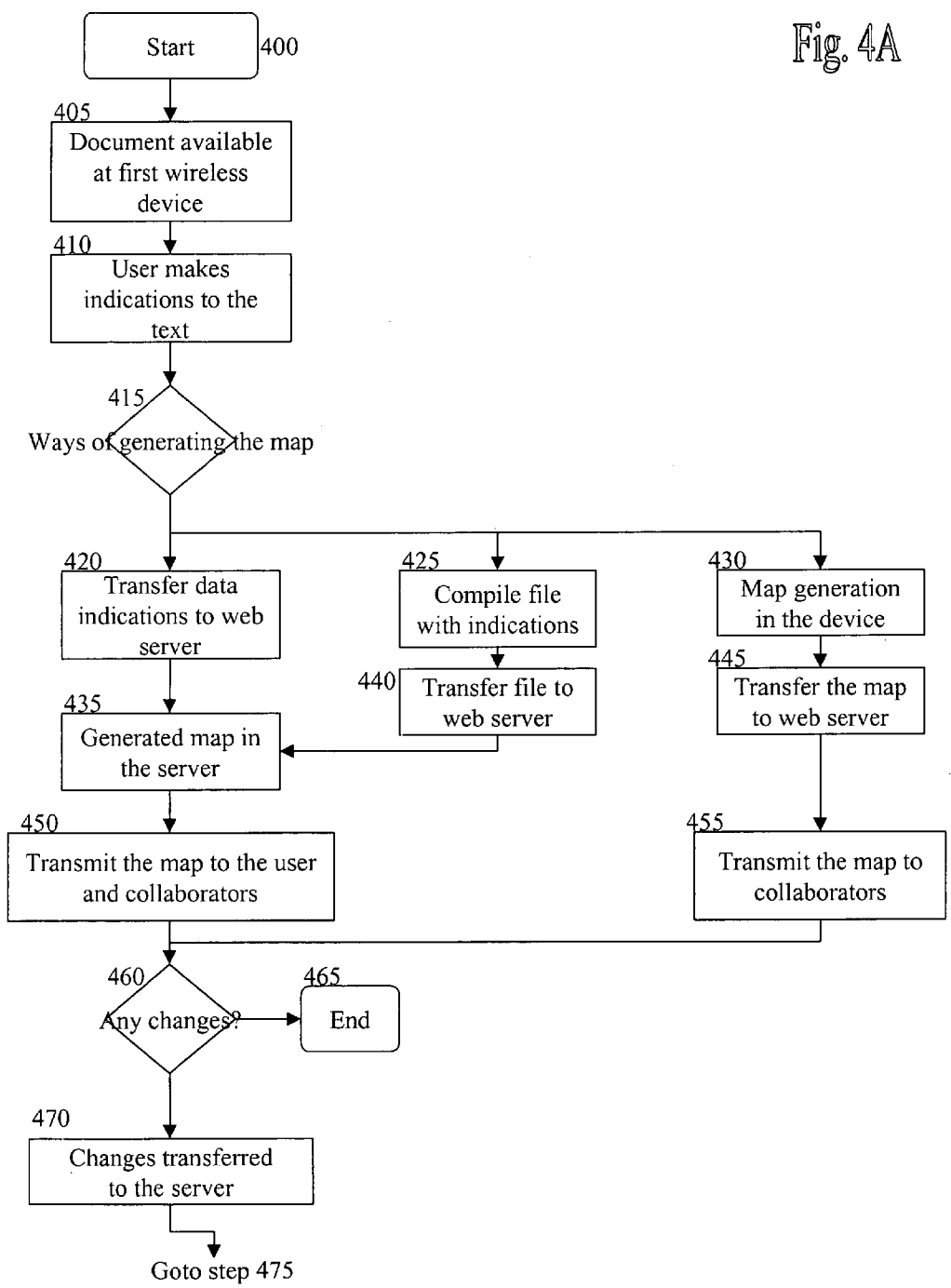

Utilizing the system of FIG. 1, the method of the present invention proceeds according to the steps shown in the flow chart of FIGS. 4A and 4B. The method starts at step 400. At step 405, the information, such as text document, appears on the output 180, for example a display, of the wireless terminal 100. (For illustrative purposes, terminal 100 is described as initiating the procedure; any other terminal, such as terminals 110, 120, 170 may be substituted). The document information may be manually input through the input 190 or it may be loaded onto the terminal 100 through another input means such as a storage media or via/by the Internet. The wireless terminal, 100 may also be able to retrieve the document information according to users' search queries from the server 150. The contents of the document information are transferred to the wireless terminal 100 in one of various ways, such as by transmission from the Web server 150 via the Internet 160 and the wireless communications network 130 in response to a user request, by broadcasting to the wireless terminal 100, or by loading the document information locally at the wireless terminal 100 into the memory 195 or into the data storage 196.

The user of the wireless terminal 100 reviews the document information on the output 180 such as a display, at step 410, and where the generation of a pictorial representation of the contents of the document information is deemed appropriate, analyzes how the contents of the documents information might be presented in a map or in the form that is easy to piece together. The document may, for example, be best categorized by partitioning certain segments of the content into logical segments that can be separately categorized, and, if the contents can be partitioned, the user demarcates and makes indications where to insert the partitions and/or what to indicate.

For example, in a text document discussing three topics, the user indicates where topics change using the input 190. The user can additionally, or in the alternative, determine key (i.e., important) words or sections in the text of the document that best reflects the ideas in the text and can be used to outline the key concepts therein. The user selects and demarcates these portions of the document, i.e., the key words or sections, using the input 190 by underlining, highlighting, or otherwise selecting them and then assigns the selected words or sections to a category by any mechanism for categorization, such as by topic, either by explicitly selecting a predefined or user-defined category by the title of the category or by choosing a number that denotes the desired category. A color can also be used to indicate the categorization. The wireless terminal 100 can have a menu from which the categorization is controlled. The menu has multiple category levels and ways of performing the categorization.

Thus, the categorization can be automated that the wireless terminal 100 controls it while the user makes the indications and/or demarcation, or the user can control the categorization.

After partitioning the selections of text and/or demarcating and categorizing the key words or selections, the next step comprises selecting a way of generating the maps at step 415. 1) The map can be generated by transferring the mark-ups or indications to the web server 150 at step 420 and then the map is generated in the web server 150 at step 435 by the mapping program tool 152. 2) Alternatively, the map can be generated by compiling the entire document file with mark-ups/indications at step 425 and then transferring the file having the compiled indications to the web server 150 at step 440. 3) Alternatively, the map can be generated by map generation in the wireless terminal 100 at step 430 where the map-generating tool is included in the wireless terminal 100. The map is then transferred to the web server 150 which transmits the map to predetermined possible collaborators, such as other terminals, at step 455. In possibilities 1) and 2), the map is transferred to every terminal that is granted access to utilize the map, that is the user (master) and collaborators at step 450. The transmissions are via/by mobile networks 130, 140 and the Internet 160 depending where the terminal is in the system architecture. Wireless terminals 100, 110, 120 have a radio link 125 to the pertinent mobile network 130 or 140.

As one example, a user at the wireless terminal 100 marks-up a text document=(not shown) and causes the generation of the Learning Method outline of FIGS. 6A and 6B. The markings on the document demarcate the text shown in the outline as text to be pictorially represented on the map and the text is categorized by the user at the wireless terminal 100 to create the number scheme shown in the outline. The user may alter the order of the categorization, thereby altering the order (for example, the number scheme) in which the mark-ups will appear in the map 700. The outline is input into the mapping program tool 152, such as MindManager program, which transforms the outline of FIGS. 6A and 6B into the map 700 shown in FIG. 7. Thus, the headings of the Learning Methods outline of FIGS. 6A and 6B, including the headings "1. By Imitation", "2. By told", "3. By collaboration", "4. By self-study from resources", "5. By doing", "6. By all senses", and their respective sub-headings 1.1-1-3, 2.1-2-5, 3.1-3.15, 4.1-4.10, 5.1-5.4.4, and 6.1-6.6, are mapped onto map 700 of FIG. 7 as branches 710, 720, 730, 740, 750, 760 emanating from the central node 705 labeled "Learning Methods". Sub-branches, 711, 721, 731, 741, 751, 761 extend from the branches 710, 720, 730, 740, 750, 760, respectively to illustrate respective sub-headings 1.1-1-3, 2.1-2-5, 3.1-3.15, 4.1-4.10, 5.1-5.4.4, and 6.1-6.6. Additional pictures 770, 772, 774, 776a, 776b, 778, 780 representative of the various headings 1, 2, 3, 4, 5, 6 are inserted next to the respective links 710, 720, 730, 740, 750, 760 as devices to help people more quickly understand and remember the concepts illustrated in FIG. 7. The graphical tools available in the software are then used by the user to enhance the appearance of the map according to the user's preferences. Each heading may optionally be a hyperlink pointing to the portions(s) of the original text associated with the heading or pointing to the additional text user has input. The map 700 may also be converted back to the list mode shown in the FIGS. 6A and 6B.

Sending the map 700 to the collaborators offers these users an opportunity to make changes and improve upon the map 700. Preferably, the user at wireless terminal 100 who initially marks-up/indicates the document to generate the map 700 will be the "master user" who identifies to the server 150 the other authorized users (actually the authorized "wireless terminals" used by those users) who may access or be sent map 700 and who control the privileges of the other users, including the other users' level of access to the document, such as whether read and write or read only privileges are granted. The users at terminals 110, 120, 170 who did not originate the marked-up/indicated version of the documents, including the partitioning of the sections and selection of the key words or sections, may receive read only privileges. In this instance, the users at terminals 110, 120, 170 can collaborate on preparing the map 700 only by sending suggestions, such as by email, chatting through the networks, or by talking using a phone or the terminal, to the primary user at the terminal 100. Read and write privileges permit the receiver of these privileges to make these changes directly on the map 700.

The users can be queried or suggest whether they have any changes to suggest or enter, depending on their level of privileges at step 460. However, the query or suggestion is not necessary to the process. If there are no changes, the process ends (step 465). At step 470, if there are changes, the changes are transferred to the Web server 150. The changes are automatically entered onto the map 700 if the person who transmitted them has write privileges (step 475), and the revised map 700 is sent to the users with the changes already incorporated (step 480). Changes can be entered in different ways. For example, they can be shown in redlining on the map 700, or they can be entered without revision marks if all agree on the changes. If the person transmitting the changes to the Web server 150 at step 470 does not have write privileges (step 475), the changes are transmitted as proposals to the other collaborators (step 485). A person with write privileges may then accept or reject the changes (step 490); that decision is transmitted back to the Web server 150. An acceptance causes the changes to be entered onto map 700 (step 480) and the revised map is sent to the various collaborators. The process then returns to step 460, and it is again determined whether any additional changes are proposed or made by any of the collaborators. If additional changes are to be made, the process returns to step 470. If there are no additional changes, the process ends (step 465).

The original marked up document can be saved and links can be maintained between the document and points on the map corresponding to words or sections of the document so that when a map user selects, for example, a picture, word, phase, or multimedia by clicking on an item in the map 700, the corresponding element in the document and the surrounding text or data reappears on the output 180.

The map 700 may be transferred also from wireless terminal (for example, terminal 100) to another wireless terminal (for example any of terminals 110, 120, 170) without using server 150 or without the Internet 160. Moreover, the map 700 may be given to any other user that can input and view the map 700 and who has not participated in the creation of the map 700.

Figure 5:
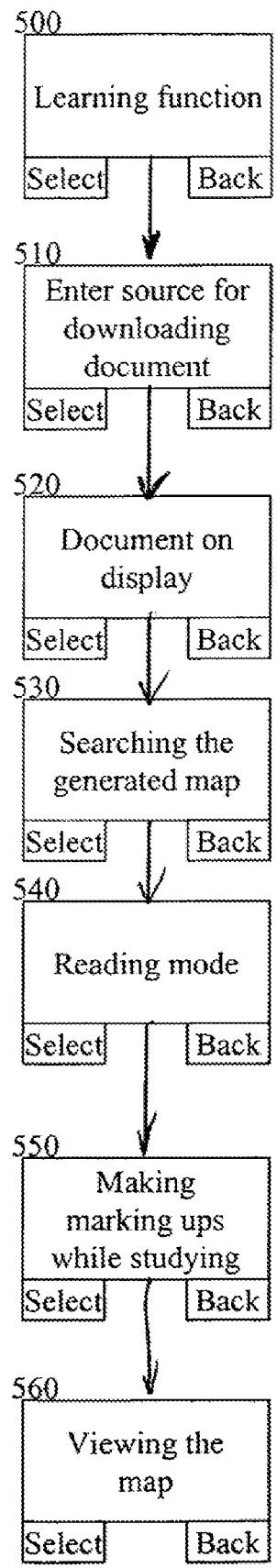
FIG. 5 illustrates a flow chart of the steps for performing the method in the terminal according to the embodiment of the invention.

As one example of the manner in which the system of FIG. 2 may be utilized, the method of the present invention proceeds in wireless terminals 100, 110, 120 according to the steps shown in the flow chart of FIG. 5. The user enters a learning function by selecting it in the terminal (step 500). The selecting step 500 and the selections that follow may be made by input means using the input 190. The user is asked for document information at step 510 which the user provides preferably by entering the location of the site from which the document may be downloaded. The document information may be manually input through the input 190 or it may be loaded onto the terminal 100 through another input means such as a storage media or via/by the Internet. The contents of the document information are transferred to the wireless terminal 100 in one of various ways, such as by transmission from the Web server 150 via the Internet 160 or the wireless communications network 130 in response to a user request, by broadcasting to the wireless terminal 100, or by loading the document information locally at the wireless terminal 100 into the memory 195 or the data storage 196. After the wireless terminal 100, 110, 120 has received the document or a requested fragment of the document, it is shown on the output 180, for example, on the display of the terminal (step 520). The user has an option to search any map corresponding to the document information (step 530). The user next enters a reading mode by selecting it (step 540). The user reads/studies the document information and, while reading, the user makes mark-ups/indications in the document using the input 190 (step 550). After the map is generated by the map generating means, the user can view the map by selecting the option to view the map from the menu of the wireless terminal's learning mode (step 560).

Map 700 thereby aids the user to learn, remember and understand the content of, for example, a document, the various parts of the content, and the relationship between the parts. This learning method, commonly known as the "deep learning method", is scientifically proven to be one of the best ways to learn and understand a subject.

This invention is particularly useful as an educational tool for students to collaborate on a project, such as in generating maps of class notes saved in electric form. A group of student can create and view the map online, thus creating online notes. The invention is also useful when creating knowledge concepts in other area than education. Moreover, the information from which map 700 is created can be stored along with map 700 and category information to allow a user to click on a portion of map 700 to see the context in which the topic or words are discussed in the document. In this case, when using the outline, if a student in the group wishes to review the outlined concept in greater detail or any extra information the student has entered to that point, the student may select an entry on the map 700 such as by clicking on the entry, and the corresponding detailed section of notes or extra information will appear on the output 190.

Figure 8:
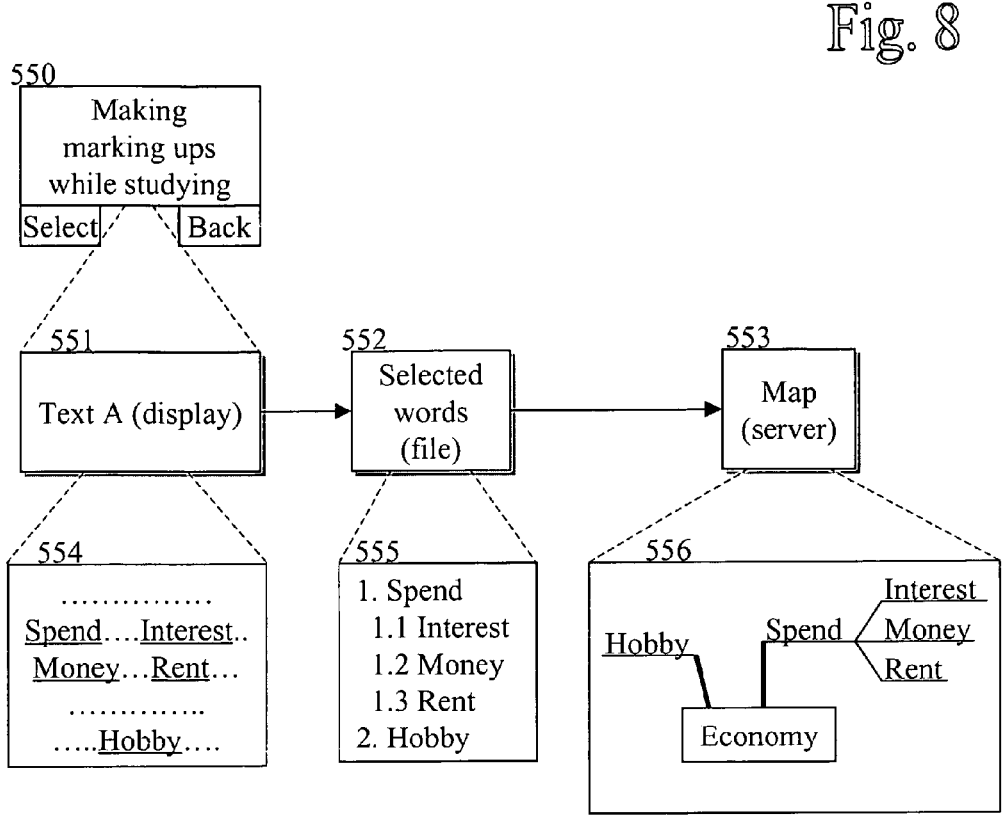
FIG. 8 depicts one example of the creation of the pictorial presentation according to the invention.

As an example, the method of the present invention proceeds in the system according to the steps shown in the flow chart of FIG. 8. The user is viewing text displayed on the display of the wireless terminal 100. A piece of text information 554 having the words to be indicated or selected (Spend, Interest, Money, Rent, and Hobby) is displayed on the display 180 of the wireless terminal 100. While reading, the user makes mark-ups or indications, such as underlines or highlights, to the text information (step 551). The user sets the categorization level (such as 1. to Spend and 1.1 to Interest, 1.2 to Money, 1.3 to Rent and 2. Hobby) and the order of the words in the same categorization level (1.1 Interest, 1.2 Money, 1.3 Rent). The information 554, mark-ups/indications, and categorization levels and orders are saved to a data file 555, and wireless terminal 100 transfers the data file 555 to the Server 150 via/by mobile network 130 and Internet 160 (step 552). Where a map is generated at the server, the data file 555 may be included in an message comprising a header describing an address such as a URL, and a body (or data fields) incorporating the demarcations of a selected portion of information, making indications representing a highlight or underline, and/or an assignment assigning the selected portion or indication to a category. Data file 555 has the required information to generate the map 556 that can comprise the selected words and the categorization of the words.

Wireless terminal 100 may also send the user's mark-ups/indications as a series of several data files 555 to server 150. Each of the data files 555 may thus be sent online substantially immediately after the user has made an indication to the text and set the categorization level. In this instance, each data file will have less information than if all of the information were sent at a single time. For example, the first data file 555 sent may only comprise the entry "1. Spend". Server 150 generates a map 556 according to received data file 555 by the mapping program tool 152 (step 553). Server 150 may also generate map 556 from several data files 555 it has received. The map may now be transmitted to the user of the wireless terminal 100 and possibly to the collaborators.

The user may also in one embodiment of the invention enter knowledge or information that he or she has using the terminal 100. The user may not necessarily have any learning material at the wireless terminal 100 but the user enters the knowledge he or she has into the terminal 100 using the input 190 as, for example, words listed in FIGS. 6A and 6B directly. After the user has input the words, the map generation is similar to the other embodiments.

Thus, while there have shown and described and pointed out fundamental novel features of the invention as applied to a preferred embodiment thereof, it will be understood that various omissions and substitutions and changes in the form and details of the devices illustrated, and in their operation, may made by those skilled in the art without departing from the spirit of the invention. For example, it is expressly intended that all combinations of those elements and/or method steps which perform substantially the same function in substantially the same way to achieve the same result are within the scope of the invention. Moreover, it should be recognized that structures and/or elements and/or methods steps shown and/or described in connection with any disclosed form or embodiment of the invention may be incorporated in any other disclosed or described or suggested form or embodiment as a general matter of design choice.

What is claimed is:

1. A method comprising:
   receiving at a wireless terminal at least one indication to information displayed thereon, wherein the indication involves marking up one or more keywords, one or more textual sections, or a combination thereof onto the information that is at least part of a presentation or description, the indication including at least one of a highlight, underline, or a demarcation of the information;
   causing, at least in part, categorization of the information based, at least in part, on the at least one indication;
   causing, at least in part, generation of an outline of the information based, at least in part, on the categorization; and causing, at least in part, representation of a pictorial representation of the information at the wireless terminal based upon the outline, wherein the pictorial representation includes one or more conceptual maps of nodes connected with logic links; wherein the wireless terminal is identified and authorized to a set privilege level for modifying the information, the pictorial representation, or a combination thereof;
   causing, at least in part, conversion of the pictorial representation back to the outline of the information based upon a selection, wherein one or more headings in the outline are hyperlinked to one or more portions of the information, additional text input by a user, or a combination thereof, and the one or more conceptual maps represent at least one of a content, a highlight of said information, an underline of said information, or a demarcation of the information.

2. A method of claim 1, further comprising: causing, at least in part, transmission of the at least one indication, the categorization, the outline, the pictorial representation, or a combination thereof, to a server, one or more other wireless terminals, or a combination thereof, wherein said information is one of an electronically-stored document, a paper document, multimedia data, and a knowledge.

3. A method of claim 2, wherein the marking up indicates one or more topic or concept change locations in the information, and said transmission comprises transferring data information via one or more wireless networks, the Internet, or a combination thereof, and the one or more wireless networks comprise at least one of GSM, GPRS, and UMTS.

4. A method of claim 2, wherein the marking up is automated, the pictorial representation is generated at the wireless terminal or the server, and the transmission is carried out via at least one message.

5. A method of claim 2, wherein the marking up is made by one or more wireless terminals, and the transmission is further based, at least in part, upon levels of access to the information assigned to the server, the one or more other wireless terminals, or a combination thereof.

6. A method of claim 1, wherein the categorization, the outline, and the pictorial representation are processed at the wireless terminal independently from a central server and the one or more conceptual maps are transmitted and revised among the wireless terminal and one or more other wireless terminals without involving the central server.

7. A method of claim 1, further comprising: causing, at least in part, search for the information based, at least in part, on the one or more conceptual maps.

8. An apparatus comprising: at least one processor; and at least one memory including computer program code for one or more programs, the at least one memory and the computer program code configured to, with the at least one processor, cause the apparatus to perform at least the following,
   receive at a wireless terminal at least one indication to information displayed thereon, wherein the indication involves marking up one or more keywords, one or more textual sections, or a combination thereof onto the information that is at least part of a presentation or description, the indication including at least one of a highlight, underline, or a demarcation of the information;
   cause, at least in part, categorization of the information based, at least in part, on the at least one indication;
   causing, at least in part, generation of an outline of the information based, at least in part, on the categorization; and
   cause, at least in part, representation of a pictorial representation of the information at the wireless terminal based upon the outline, wherein the pictorial representation includes one or more conceptual maps of nodes connected with logic links;
   wherein the wireless terminal is identified and authorized to a set privilege level for modifying the information, the pictorial representation, or a combination thereof;
   causing, at least in part, conversion of the pictorial representation back to the outline of the information based upon a selection, wherein one or more headings in the outline are hyperlinked to one or more portions of the information, additional text input by a user, or a combination thereof, and the one or more conceptual maps represent at least one of a content, a highlight of said information, an underline of said information, or a demarcation of the information.

9. An apparatus of claim 8, wherein when the pictorial representation is generated at the wireless terminal, the at least one message further comprises the pictorial representation and the at least one message is transmitted to a server and one or more other wireless terminals, and when the pictorial representation is generated at the server, the server transmits the pictorial representation to the wireless terminal and the one or more other wireless terminals.

10. A method comprising:
    receiving at a server from one or more wireless terminals at least one message comprising at least one indication to information displayed on one of the wireless terminals, wherein the indication involves marking up one or more keywords, one or more textual sections, or a combination thereof onto the information that is at least part of a presentation or description, the indication including at least one of a highlight, underline, or a demarcation of the information;
    causing, at least in part, categorization of the information based, at least in part, on the at least one indication;
    causing, at least in part, generation of an outline of the information based, at least in part, on the categorization; and
    causing, at least in part, generation of a pictorial representation of the information at the server based upon the outline, wherein the pictorial representation includes one or more conceptual maps of nodes connected with logic links;

wherein the wireless terminal is identified and authorized to a set privilege level for modifying the information, the pictorial representation, or a combination thereof;

causing, at least in part, conversion of the pictorial representation back to the outline of the information based upon a selection, wherein one or more headings in the outline are hyperlinked to one or more portions of the information, additional text input by a user, or a combination thereof, and the one or more conceptual maps represent at least one of a content, a highlight of said information, an underline of said information, or a demarcation of the information.

11. A method of claim 10, further comprising: causing, at least in part, transmission of the pictorial representation to the one or more wireless terminals to be represented thereon.

12. A method of claim 11, further comprising: determining whether the at least one indication to information is authorized for the one wireless terminal based, at least in part, on the privilege level, wherein the pictorial representation is generated based, at least in part, on the determination.

13. A method of claim 12, further comprising:
when determining the at least one indication to information is not authorized for the one wireless terminal, proposing one or more changes to the at least one indication;
and causing, at least in part, transmission of the proposed one or more changes to a master wireless terminal.

14. A method of claim 13, further comprising: receiving an acceptance message of the proposed one or more changes from the master wireless terminal, wherein the pictorial representation is generated based, at least in part, on the proposed one or more changes.

15. An apparatus comprising:
at least one processor; and at least one memory including computer program code for one or more programs, the at least one memory and the computer program code configured to, with the at least one processor, cause the apparatus to perform at least the following, receive at a server from one or more user terminals at least one message comprising at least one indication to information displayed on one of the user terminals, wherein the indication involves marking up one or more keywords, one or more textual sections, or a combination thereof onto the information that is at least part of a presentation or description, the indication including at least one of a highlight, underline, or a demarcation of the information;

cause, at least in part, categorization of the information based, at least in part, on the at least one indication;

cause, at least in part, generation of an outline of the information based, at least in part, on the categorization; and cause, at least in part, generation of a pictorial representation of the information at the server based upon the outline, wherein the pictorial representation includes one or more conceptual maps of nodes connected with logic links, wherein the wireless terminal is identified and authorized to a set privilege level for modifying the information, the pictorial representation, or a combination thereof;

causing, at least in part, conversion of the pictorial representation back to the outline of the information based upon a selection, wherein one or more headings in the outline are hyperlinked to one or more portions of the information, additional text input by a user, or a combination thereof, and the one or more conceptual maps represent at least one of a content, a highlight of said information, an underline of said information, or a demarcation of the information.

16. An apparatus of claim 15, wherein the apparatus is further caused to: determine whether the at least one indication to information is authorized for the one wireless terminal based, at least in part, on the privilege level, wherein the pictorial representation is generated based, at least in part, on the determination.

* * * * *